May 15, 1962   W. E. TURK   3,035,197
TELEVISION CAMERA TUBES
Filed Nov. 12, 1959   2 Sheets-Sheet 1
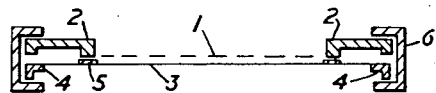
FIG. 1.   PRIOR ART
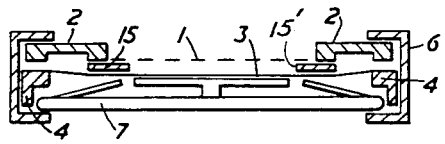
FIG. 2.
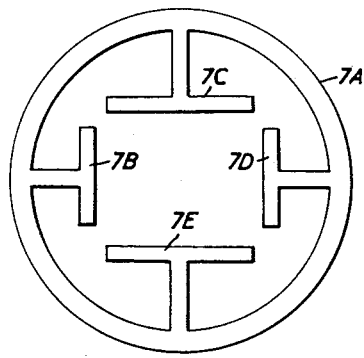   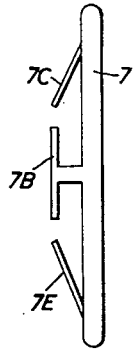
FIG. 3.   FIG. 4.
INVENTOR
Walter Ernest Turk
BY
Baldwin & Wight
ATTORNEYS May 15, 1962   W. E. TURK   3,035,197
TELEVISION CAMERA TUBES
Filed Nov. 12, 1959   2 Sheets-Sheet 2

INVENTOR.
WALTER ERNEST TURK
BY his attorneys,
Baldwin & Wight

3,035,197
Patented May 15, 1962

3,035,197
TELEVISION CAMERA TUBES
Walter Ernest Turk, Chelmsford, England, assignor to English Electric Valve Company Limited, London, England, a company of Great Britain
Filed Nov. 12, 1959, Ser. No. 852,516
Claims priority, application Great Britain Nov. 21, 1958
3 Claims. (Cl. 313—65)

This invention relates to television camera tubes and more specifically to camera tubes such as image orthicon tubes of the kind comprising a signal storing target structure having a very thin partially conducting membrane, usually of glass.

One of the difficulties met with in image orthicon and similar television camera tubes of the kind referred to is that the membrane forming part of the target structure is very apt to vibrate at its own natural frequency and/or at a frequency harmonically related thereto if the tube is subjected to mechanical shock or vibration or even strong acoustic waves. If such acoustically or mechanically induced vibrations occur there are corresponding vibrations in the storage capacitance and interference signals appear in the output signals from the tube. When the tube is employed in a conventional line scanning television system, these interference signals usually manifest themselves as dark horizontal bars in the reproduced pictures. The effect is generally known as microphony from an analogy with microphonic effect in an ordinary thermionic valve. The invention seeks to reduce microphony in tubes of the kind referred to.

Figure 6:
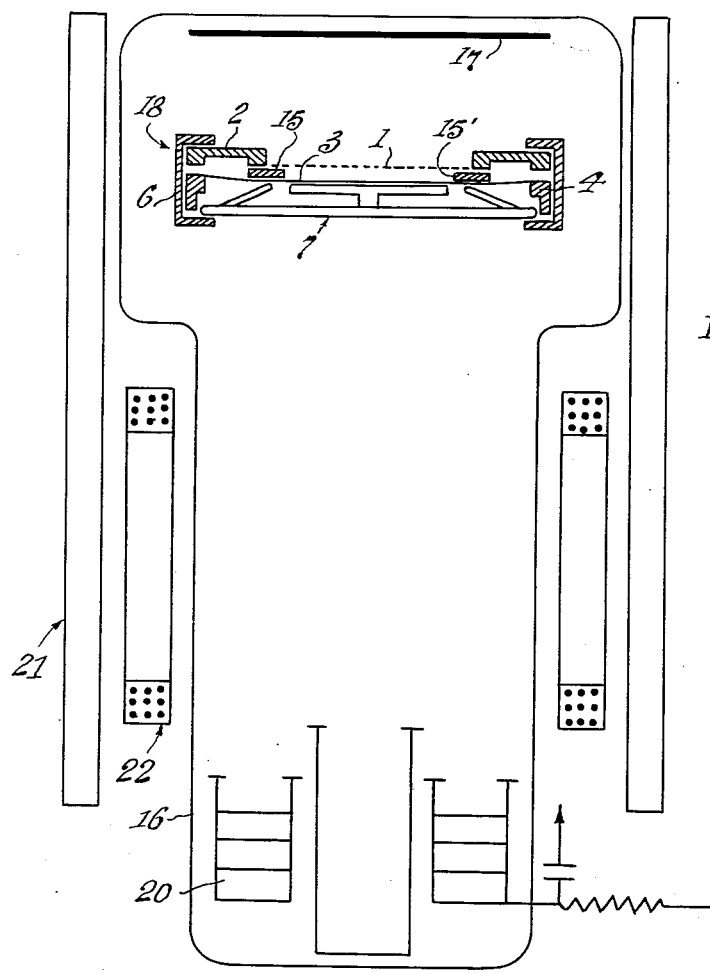
Figure 5:
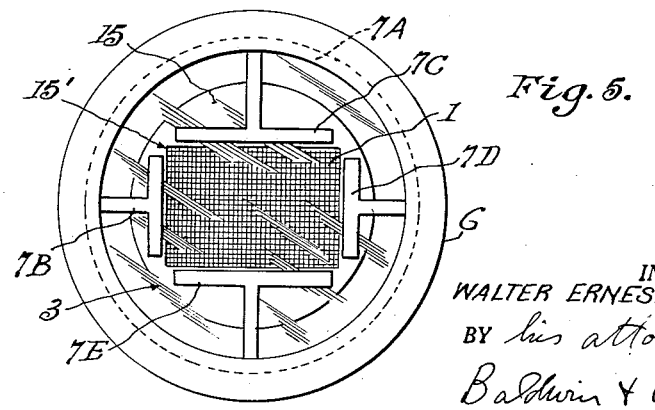

The invention is illustrated in and further explained in connection with the accompanying simplified drawings in which FIG. 1 is an explanatory figure showing in section the usual present day construction of the target structure of an image orthicon tube; FIG. 2 is a view similar to FIG. 1 showing a preferred form of target structure in accordance with the invention; and FIGS. 3 and 4 are mutually perpendicular views of the membrane tensioning device incorporated in the structure of FIG. 2. FIG. 5 of the drawing shows the plan view of the target from the end of tensioning device 7. FIG. 6 shows the target typically mounted in an image orthicon tube of the kind shown on page 832 of "Radio Engineering" by Terman (third edition), published by McGraw-Hill, 1947.

Referring to FIGURE 1, the target structure therein shown consists of a disc shaped mesh or grid 1 held by a carrier ring 2 and closely adjacent to a disc shaped glass membrane 3 which is held by a carrier ring 4. Predetermined close spacing between the mesh 1 and the membrane 3 is obtained by an interposed annular spacer shim 5 as shown. An outermost clamping ring or clip 6 of suitable section is used to clamp the parts tightly together and hold them so. In FIGURE 1, for the sake of clarity of drawing, the parts are shown slightly spaced, though it will be understood that the clip or ring 6 is deformed to hold them tightly together.

With the construction of FIGURE 1 vibration of the membrane 3 in a circular mode is readily easily induced and microphony can readily occur. The present invention seeks to meet this difficulty and in its broadest aspect the said invention consists in tensioning the membrane rectangularly by tension means engaging the membrane outwardly of the desired rectangular picture signal storing area thereof. By the expression "tensioning rectangularly" in meant applying tensioning forces in directions substantially parallel to the sides of a rectangle.

According to a feature of this invention a television camera tube storage target structure of the kind in which a very thin signal storing membrane is spaced from an adjacent potential controlling grid or mesh by a spacing shim comprises a signal storing membrane, a potential controlling grid or mesh spaced from said membrane by interposed spacer means providing a substantially rectangular aperture with its periphery outside the desired picture signal storage area, and, on the side of said membrane remote from the spacing means, membrane tensioning means adapted to engage said membrane outwardly of said rectangular storage area and to tension said area rectangularly, i.e. in directions substantially parallel to the substantially perpendicular sides of said area.

Preferably the spacer means is constituted by a spacer shim having a central rectangular aperture.

Preferably also the membrane tensioning means is constituted by a ring with four internal spring arms integral therewith and biased out of the plane of the ring. Each of these arms is preferably T-shaped with a cross piece extending substantially parallel to and outwardly of a different side of the rectangular picture signal storing area of the membrane and a stem piece joining the middle of the cross piece to the ring.

According to a further feature of this invention a television camera tube storage target structure comprises a circular membrane of glass surrounded by and fixed to a support ring; a circular grid or mesh surrounded by and fixed to a second support ring; a circular spacing shim having a central rectangular aperture and interposed between the membrane and the grid or mesh; a tensioning member having four mutually perpendicular substantially T-shaped spring members integrally formed with and inside a ring with the stems of said T-shaped members bent out of the plane of the ring towards the membrane and the cross pieces of said T-shaped members lying substantially parallel to and outwardly of the sides of the aperture in the shim; and an outermost clamping ring or clip adapted to clamp and hold together the two support rings, and the ring which forms part of the tensioning member.

FIGURE 2 shows in a manner similar to that of FIGURE 1 a preferred embodiment of the invention. Like parts of FIGURES 1 and 2 are indicated by like references. As before there is the mesh or grid 1 in its carrier ring 2 and the thin glass membrane 3 in its carrier ring 4. Again, as before, there is a spacer shim between the mesh 1 and the membrane 3, but the said shim is no longer an annular ring 5 as in FIGURE 1 but is a disc 15 having a rectangular centre aperture 15' which is dimensioned in accordance with the picture signal storage area of the membrane 3 so that the edges of the aperture 15' lie just outside of this area. In addition there is provided on the side of the membrane remote from the spacer shim 15 a tensioning device 7 which is separately shown in FIGURES 3 and 4. This tensioning device is adapted to tension the membrane rectangularly by contacting therewith outside the picture area. It may take any of a variety of forms, but in the simple and convenient form shown in FIGURES 3 and 4, it is an integral device consisting of a ring 7A with four springy inwardly projecting T-pieces 7B, 7C, 7D and 7E. These T-pieces, which are bent to provide spring bias out of the plane of the ring 7A as best shown in FIGURE 4, are at right angles to each other, each having its "stem" projecting radially inward from the ring and joining the ring to the middle point of the appropriate "cross piece." The cross pieces of the T members contact with the membrane along the sides of an imaginary rectangle just outside the picture storage area of the membrane, and the said membrane is therefore tensioned rectangularly. The result of this is that the membrane is far less prone to vibration than in the normal construction of FIGURE 1 in which it is free to vibrate in a circular mode. While vibration is, of course, possible, it is not merely far less likely to occur, but if it does occur it is likely to be with considerably less amplitude with the rectangular tensioning than if circular mode vibration were free to occur. In the construction of FIGURE 2, as in FIGURE 1, the parts are clamped together and held by an outermost clamping ring 6, though again, for clarity of drawing, the parts are shown slightly spaced.

Referring to FIG. 6, the envelope of the tube is designated 16, the photo-cathode is designated 17, the target structure is designated 18, the electron gun is designated 19, the electron multiplier is designated 20, the axial focussing coil is designated 21 and the vertical deflecting coil is designated 22.

I claim:

1. A structure in a cathode ray tube of the image orthicon type for reducing microphony comprising a signal storage membrane, a potential controlling grid spaced from said membrane, spacer means interposed between said grid and said membrane and providing a substantially rectangular aperture having its periphery outside the desired picture signal storage area and a tensioning device comprising a ring having a plurality of arms contacting with said membrane outside the picture area, said arms being biased to provide the requisite tension.

2. A structure as set forth in claim 1, wherein said spacer means comprises a disc having a rectangular central aperture dimensioned in accordance with the picture storage area of the membrane.

3. A structure as set forth in claim 1, wherein said tensioning device comprises a plurality of T-shaped internal spring arms integral with the ring and biased out of the plane of the ring, said arms being parallel to and outwardly of the sides of said storage area.

References Cited in the file of this patent

UNITED STATES PATENTS

| | | |
|---|---|---|
| 2,802,126 | Day | Aug. 6, 1957 |
| 2,909,687 | Turk et al. | Oct. 20, 1959 |